United States Patent
Laurell et al.

(10) Patent No.: US 8,950,175 B2
(45) Date of Patent: Feb. 10, 2015

(54) EXHAUST-GAS AFTERTREATMENT DEVICE

(75) Inventors: Mats Laurell, Gothenburg (SE); Jan Dahlgren, Torslanda (SE); Staffan Ovesson, Hisings Backa (SE)

(73) Assignee: Volvo Car Corporation, Gothenburg (SE)

(*) Notice: Subject to any disclaimer, the term of this patent is extended or adjusted under 35 U.S.C. 154(b) by 167 days.

(21) Appl. No.: 13/291,608

(22) Filed: Nov. 8, 2011

(65) Prior Publication Data

US 2012/0110989 A1    May 10, 2012

(30) Foreign Application Priority Data

Nov. 10, 2010  (EP) ..................................... 10190590

(51) Int. Cl.
| | |
|---|---|
| *F01N 3/28* | (2006.01) |
| *F01N 3/20* | (2006.01) |
| *F01N 3/00* | (2006.01) |
| *F01N 1/08* | (2006.01) |

(52) U.S. Cl.
CPC .............. *F01N 3/2006* (2013.01); *F01N 3/005* (2013.01); *F01N 3/2013* (2013.01); *F01N 3/2803* (2013.01); *F01N 1/084* (2013.01); *F01N 2240/20* (2013.01); *F01N 2470/22* (2013.01); *Y02T 10/26* (2013.01)
USPC ................... 60/299; 60/296; 60/309; 60/297; 60/324

(58) Field of Classification Search
USPC ........... 60/295, 296, 297, 299, 303, 309, 311, 60/320, 324
See application file for complete search history.

(56) References Cited

U.S. PATENT DOCUMENTS

| | | | | |
|---|---|---|---|---|
| 2,921,432 | A | * | 1/1960 | Marcotte et al. ................. 55/307 |
| 5,277,026 | A | * | 1/1994 | Boll et al. ......................... 60/288 |
| 5,396,764 | A | | 3/1995 | Rao et al. |

(Continued)

FOREIGN PATENT DOCUMENTS

| | | |
|---|---|---|
| DE | 10053097 A1 | 5/2002 |
| EP | 0931913 B1 | 11/2002 |

(Continued)

OTHER PUBLICATIONS

European Search Report for Application No. 10190590.9, dated Mar. 24, 2011, 6 pages.

*Primary Examiner* — Thomas Denion
*Assistant Examiner* — Jorge Leon, Jr.
(74) *Attorney, Agent, or Firm* — Brooks Kushman P.C.

(57) ABSTRACT

An exhaust-gas aftertreatment device for an internal combustion engine includes a catalytic converter having a tubular member which defines a volume housing a catalytic converter substrate. The volume housing the catalytic converter substrate communicates with an inlet portion for receiving exhaust gas from the engine and with an outlet portion for discharging the exhaust gas after catalytic conversion thereof in the volume. The device further has a pipe member within the tubular member which connects the inlet portion with the volume in the tubular member and guides the exhaust gas from the inlet portion in a first direction of flow. The pipe member opens downstream into a deflector which deflects the exhaust gas into the volume of the tubular member in a second direction of flow other than the first direction of flow. Unburned liquid fuel contained in the exhaust gas is deposited on the deflector for later evaporation.

7 Claims, 2 Drawing Sheets

(56) References Cited

U.S. PATENT DOCUMENTS

| | | | |
|---|---|---|---|
| 5,678,403 A * | 10/1997 | Kanehara et al. | 60/309 |
| 6,212,885 B1 * | 4/2001 | Hirota et al. | 60/288 |
| 8,091,354 B2 * | 1/2012 | Cremeens et al. | 60/309 |
| 2005/0172619 A1 * | 8/2005 | Sasaki | 60/300 |
| 2006/0008397 A1 | 1/2006 | Bruck | |
| 2007/0039316 A1 * | 2/2007 | Bosanec et al. | 60/299 |
| 2008/0041036 A1 | 2/2008 | Witte-Merl | |
| 2008/0202105 A1 * | 8/2008 | Winter et al. | 60/295 |
| 2008/0264048 A1 * | 10/2008 | Nishiyama et al. | 60/299 |
| 2009/0084083 A1 * | 4/2009 | Vachon et al. | 60/273 |
| 2010/0031645 A1 | 2/2010 | Bidner et al. | |
| 2010/0107613 A1 * | 5/2010 | Masuda et al. | 60/297 |
| 2011/0296814 A1 * | 12/2011 | Santoso et al. | 60/273 |
| 2012/0000181 A1 * | 1/2012 | Gerges | 60/274 |

FOREIGN PATENT DOCUMENTS

| | | |
|---|---|---|
| GB | 413967 | 7/1934 |
| JP | 4072414 A | 3/1992 |

* cited by examiner

EXHAUST-GAS AFTERTREATMENT DEVICE

CROSS-REFERENCE TO RELATED APPLICATIONS

This application claims foreign priority benefits under 35 U.S.C. §119(a)-(d) to EP 10190590.9, filed Nov. 10, 2010, the specification of which is hereby incorporated by reference in its entirety.

TECHNICAL FIELD

The present invention relates to an exhaust-gas aftertreatment device for improving, particularly during cold start and warming-up, catalytic conversion of exhaust gas emissions from an internal combustion engine. A catalytic converter forming part of said device comprises a tubular member which defines a volume within which a catalytic converter substrate is located. The volume with the catalytic converter substrate communicates with an inlet portion for receiving the exhaust gas emissions from the internal combustion engine and with an outlet portion for discharging the exhaust gas emissions after catalytic conversion thereof in said volume.

BACKGROUND

A catalytic converter for a vehicle comprises in general a canned and coated catalytic converter substrate in flow communication with inlet and outlet passages. It is positioned on the exhaust side of the internal combustion engine of the vehicle in order to treat exhaust gas emissions from the engine.

During cold start and warming-up of the engine, the catalytic converter is not sufficiently heated for optimum performance and the exhaust gas emissions may therefore pass through the catalytic converter without catalytic conversion thereof. To improve the heating properties, the catalytic converter is often positioned as close as possible to the exhaust ports. To accelerate heating, it is also possible to heat the catalytic converter electrically or to temporarily control combustion such that the temperature of the exhaust gas emissions is increased.

A frequent problem also particularly during cold start is that emissions in liquid form in the exhaust gas emissions do not participate in the engine combustion process. Gaseous emissions which condense on cold exhaust system surfaces present a similar problem.

Another problem in catalytic converters is that mixing of the exhaust gas emissions may not be sufficient, which results in an inhomogeneous mixture of the exhaust gas emissions passing the exhaust gas emissions sensors and reaching the inlet end of the catalytic converter. Optimum performance of the catalytic converter is negatively affected by an inhomogeneous mixture of the exhaust gas emissions. Furthermore, the exhaust gas emissions sensors will not provide the engine management system with correct feedback values.

A solution to one or more of the abovementioned problems used by some manufacturers is a so called hydrocarbon trap. Due to the fact that the catalytic converter substrate is not warm enough for catalytic conversion and that the concentration of hydrocarbon is high during cold start, a hydrocarbon trap where a trap material is coated on a typical catalytic converter substrate may be needed. The trap material stores hydrocarbon at low temperatures and releases hydrocarbon at higher temperatures. The trap material is, however, sensitive to ageing.

Another solution to the gas mixing problem may be to add a mixer or to compensate with complex software.

Finally, from US 2006/0008397 A1 it is known a space-saving exhaust gas aftertreatment unit allowing catalytic conversion for a relative long period of time even when there is only a small amount of installation space available.

In US 2008/0041036 A1, this prior art exhaust-gas aftertreatment unit is provided with an adding unit for adding, in countercurrent, a reactant flow to the exhaust gas stream to improve evaporation thereof.

SUMMARY

The present invention presents a simple, effective and reliable solution to the abovementioned problems.

This is arrived at by providing said device with a pipe member which is located within the tubular member of the catalytic converter and which connects the inlet portion with the volume in said tubular member and which guides the exhaust gas emissions from said inlet portion in a first direction of flow, and by ensuring that said pipe member downstream opens into a deflector means which deflects the exhaust gas emissions into the volume of the tubular member of the catalytic converter in a second direction of flow substantially opposite to said first direction of flow.

Thereby, the period of time before the exhaust gas emissions reach the catalytic converter is increased and mixing of the exhaust gas emissions during this period of time is improved. Although there is a mixing zone, the geometry of the exhaust-gas aftertreatment device improves the utilization of the heat, i.e. no heat is lost because e.g. the catalytic converter has to be moved farther away from the internal combustion engine.

In said device, the amount of emissions in liquid form in said exhaust gas emissions is also reduced before subjecting said exhaust gas emissions to catalytic conversion. This is accomplished by means of the pipe member and the deflector means being configured to heat said emissions in liquid form by means of heat transferred thereto from the exhaust gas emissions.

The abovementioned effect is further improved since there is more time in the device for the emissions in liquid form to be heated and transformed into gaseous form. The decreasing amount of emissions in liquid form will further promote mixing of the exhaust gas emissions.

The deflector means of said device is configured such that it can collect emissions in liquid form in the exhaust gas emissions and retain these emissions in liquid form until the operating temperature of the device and, of course, of the catalytic converter is such that said emissions in liquid form evaporate into gaseous form.

This will naturally further increase the dwell time of the exhaust gas emissions in the device to ensure that the emissions in liquid form therein are adequately transformed into gaseous form and consequently improve mixing thereof before performing the catalytic conversion, and thereby further improve the performance of the catalytic converter.

Furthermore, a collector means is provided at the deflector means for collecting excessive emissions in liquid form from said deflector means.

This will further improve the capacity of the device to retain emissions in liquid form as long as is required for the device and, of course, the catalytic converter to be heated to such extent that the emissions in liquid form are heated and transformed into gaseous form.

BRIEF DESCRIPTION OF THE DRAWINGS

The invention will be further described below by way of example only and with reference to the accompanying drawings, in which.

DETAILED DESCRIPTION

The exhaust-gas aftertreatment device 1 according to the present invention is provided for improving catalytic conversion of exhaust gas emissions from an internal combustion engine (not shown). The internal combustion engine may be of any suitable type for e.g. vehicles and other engine-driven mechanical structures.

Figure 1:
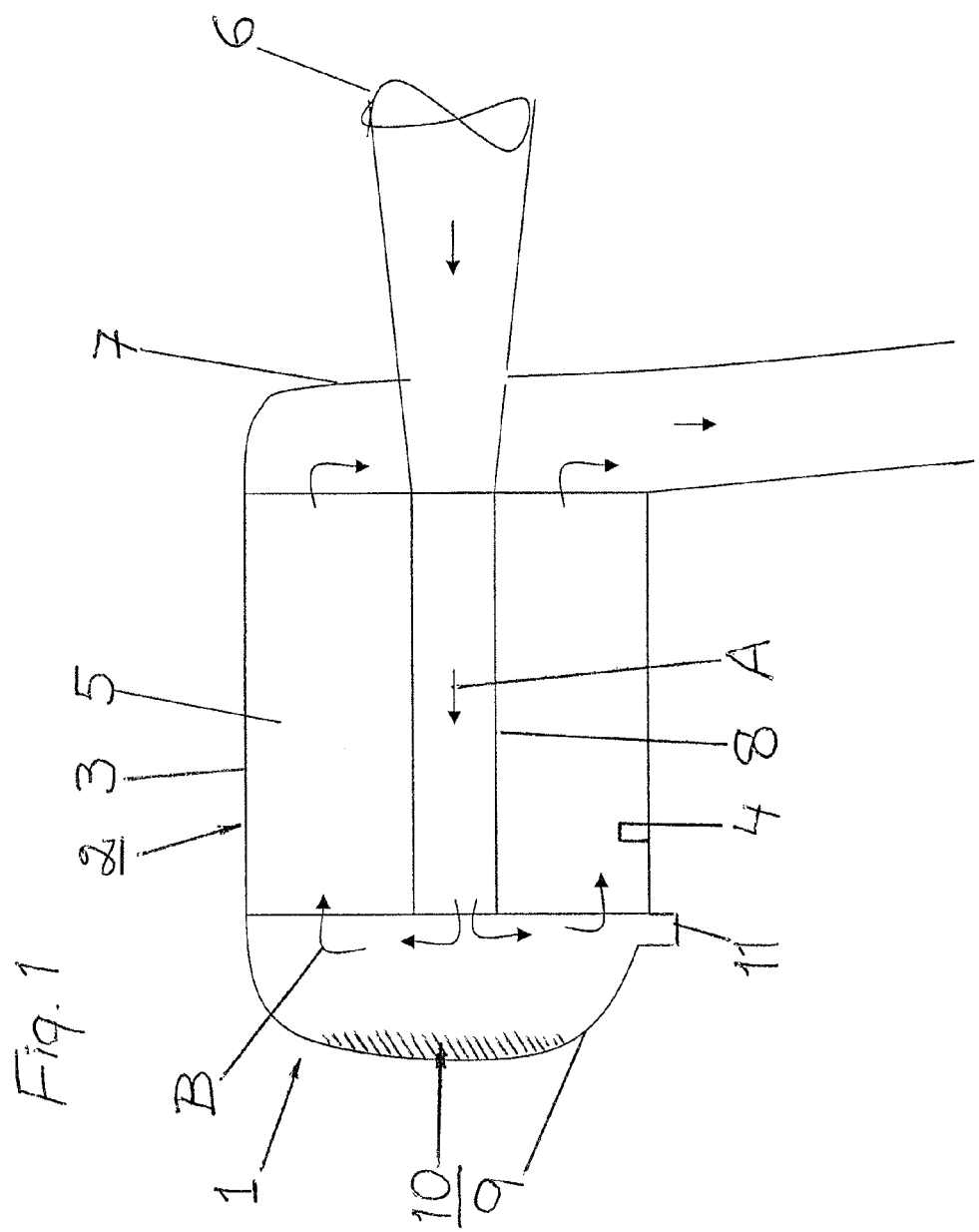
FIG. 1 is a schematic side view of an embodiment of an exhaust-gas aftertreatment device according to the present invention.

As is apparent from FIG. 1, the exhaust-gas aftertreatment device 1 according to the present invention is provided with a catalytic converter 2 which therefore constitutes a part of said device.

The catalytic converter 2 forming part of the device 1 may be of any suitable type and is therefore only schematically illustrated in FIG. 1. The catalytic converter 2 illustrated in FIG. 1 comprises a tubular member 3. This tubular member, the cross-sectional shape of which may be round, square, rectangular or of any other suitable shape, defines a volume 4 within which a catalytic converter substrate 5 of a suitable type is located. The volume 4 with the catalytic converter substrate 5 in the tubular member 3 communicates with an inlet portion 6 for receiving exhaust gas emissions from the internal combustion engine. The volume 4 with the catalytic converter substrate 5 in the tubular member 3 also communicates with an outlet portion 7 for discharging the exhaust gas emissions after catalytic conversion thereof in the volume 4. The inlet and outlet portions 6, 7 may also form part of the device or be considered as separate members. Since, as in FIG. 1, the device 1 according to the invention comprises the catalytic converter 2 and, accordingly, the catalytic converter constitutes a part thereof, the inlet and outlet portions preferably also form part of the device. Operation per se and other parts and members of the catalytic converter are not described here, since this is common knowledge and does not form part of, nor have any impact on, the present invention.

The device 1 according to the present invention further comprises a pipe member 8. The pipe member 8 is situated such that it connects the inlet portion 6 with the volume 4 in the tubular member 3 of the catalytic converter 2. The cross-sectional shape of the pipe member 8 may also be round, square, rectangular or of any other suitable shape in order to fit together with the inlet portion 6 and the tubular member 3. The pipe member 8 guides the exhaust gas emissions in a first direction of flow A, from the inlet portion 6 towards the tubular member 3, during which mixing of the exhaust gas emissions occurs. Accordingly, the presence of the pipe member 8 in the catalytic converter 2, ensures that the exhaust gas emissions are not directly subjected to catalytic conversion, and during the period of time before the exhaust gas emissions reach the catalytic converter, the exhaust gas emissions will be subjected to mixing. This prolonged mixing period before the catalytic conversion will improve the efficiency of the catalytic converter.

In the illustrated embodiment according to FIG. 1, the pipe member 8 has a cross-sectional area which is less than any cross-sectional area of the inlet member 6, which tapers towards the pipe member, i.e. tapers in the first direction of flow A of the exhaust gas emissions. Thereby, the speed of the flow of the exhaust gas emissions in the first flow direction A might increase, which in turn improves mixing of the exhaust gas emissions in the pipe member 8. Alternatively, for the same purpose, it should also be possible to configure the pipe member 8 such that it tapers in the direction of flow A of the exhaust gas emissions therein.

In the illustrated embodiment according to FIG. 1, the pipe member 8 is located centrally in the tubular member 3 of the catalytic converter 2 and it is located such that it extends in the longitudinal direction of the tubular member, surrounded by, but not communicating with the catalytic converter substrate 5 in the volume 4 therein. Please note however, that it is within the scope of the invention to locate the pipe member 8 in other ways than centrally in the tubular member 3 of the catalytic converter 2. The pipe member 8 has most suitably the same length as the tubular member 3, but can also be longer or shorter than the tubular member, based on e.g. how the pipe member is arranged in the tubular member 3 and/or based on e.g. the shape and structure of the pipe member and tubular member. Furthermore, in the illustrated embodiment according to FIG. 1, the cross-sectional area of the pipe member 8 is substantially less than, i.e. it may constitute about 1-20% of the cross-sectional area of the tubular member 3 of the catalytic converter 2 in which it is located. In this manner, the performance of the catalytic converter 2 will not be negatively affected by the inclusion of the pipe member 8 in the tubular member 3 thereof. It should be noted however, that the pipe member 8 may have a cross-sectional area relative to the cross-sectional area of the tubular member other than the 1-20% mentioned above. The pipe member 8 is of course configured such that the exhaust gas emissions flowing in the direction of flow A therein, are totally separated from the catalytic converter substrate 5 in the volume 4 in the tubular member 3 of the catalytic converter 2. As seen in FIG. 1, pipe member 8 has an exit opening at its downstream end that is axially aligned with a longitudinal axis of the pipe member.

The device 1 according to the present invention further comprises a deflector means 9. This deflector means 9 has a central section that is directly opposite the exit opening of the pipe member 8 and so deflects the exhaust gas emissions from the pipe member 8 into the volume 4 of the tubular member 3 of the catalytic converter 2 in a second direction of flow B other than the first direction of flow A. In the illustrated embodiment according to FIG. 1, this second direction of flow B of the exhaust gas emissions means that the direction of flow B through the tubular member 3 is substantially opposite to the first direction of flow A through the pipe member 8. Mixing of the exhaust gas emissions is further promoted by this deflection from the first to the second direction of flow in the deflector means 9. The improved mixing of the exhaust gas emissions results in a better catalytic conversion thereof in the catalytic converter 2.

Emissions in liquid form in the exhaust gas emissions result, inter alia, in an inhomogeneous mixture thereof. Therefore, in order to further improve mixing not only by increasing the period of time before the exhaust gas emissions are subjected to catalytic conversion, the pipe member 8 and the deflector means 9 are both configured to reduce the amount of emissions in liquid form in the exhaust gas emissions by heating the emissions in liquid form before the exhaust gas emissions reach the catalytic converter 2. This can be achieved e.g. by using heat transferred from the exhaust gas emissions to the pipe member 8 and the deflector means 9 during operation.

It can also be achieved by configuring e.g. the deflector means 9 to collect the emissions in liquid form and retain these emissions until the deflector means has been heated to such an extent that the emissions in liquid form evaporate into gaseous form. Emissions in liquid form have a higher weight than gaseous emissions and therefore, due to their higher kinetic energy, have a tendency to collide with the deflector means 9 and deposit thereon as long as the deflector means is sufficiently cold.

One way to promote this effect of collecting and retaining emissions in liquid or particulate form is to provide a layer 10 of porous material between the downstream end of the pipe member 8 and the deflector means 9. Accordingly, in one embodiment, it is possible to provide the deflector means 9, on the side thereof facing the flow of exhaust gas emissions, at least partly with a layer 10 of porous material, as in the illustrated embodiment according to FIG. 1. The layer 10 of porous material absorbs the emissions in liquid form and facilitates thereby the retention of the emissions at the deflector means. Thus, the porous material may be any material capable of absorbing emissions in liquid form and capable of retaining these emissions in liquid or particulate form until the deflector means 9 and the layer 10 of porous material have been heated such that the emissions in liquid or particulate form start to evaporate into gaseous form. The porous layers may consist of e.g. a ceramic material, silicium carbide, metallic mesh or foam etc.

Figure 2A:
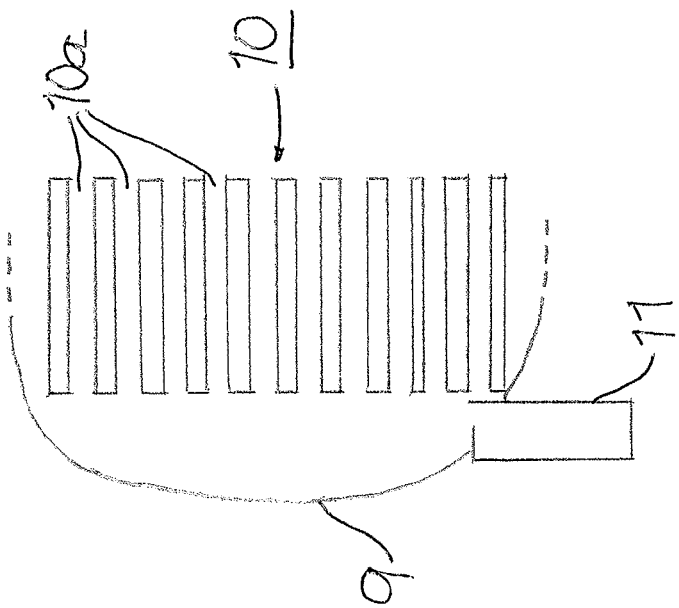
FIGS. 2a and 2b are schematic side views of alternative embodiments of details of the exhaust-gas aftertreatment device of FIG. 1.
Figure 2B:
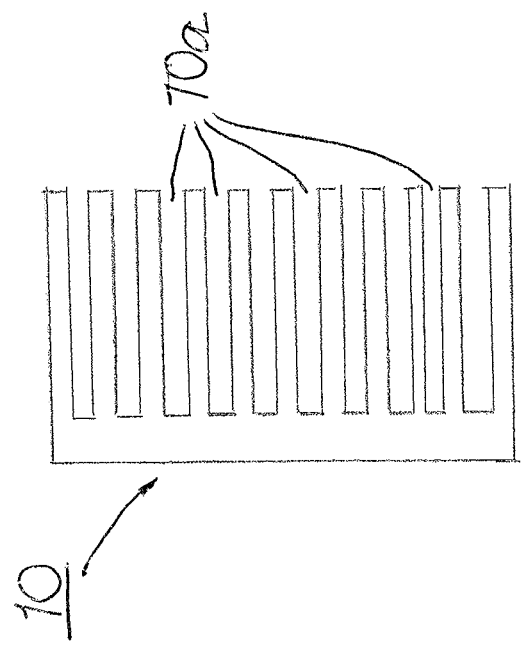

The layer of porous material may comprise a closed cell structure 10, wherein the cells 10a are closed on the side thereof facing the deflector means 9. Such a closed cell structure 10 is illustrated in FIG. 2a. The closed side of the cell structure 10 facing the deflector means 9 may also be attached to the side of the deflector means 9 facing the exhaust gas emissions, as is schematically illustrated in the embodiment according to FIG. 1. The layer of porous material may alternatively comprise an open cell structure 10. This open cell structure 10 may alternatively be located at a distance from the side of the deflector means 9 facing the flow of exhaust gas emissions, as is illustrated in FIG. 2b, permitting flow of exhaust gas emissions in liquid or particulate form through the cells 10a in the cell structure to said deflector means. The cell structure 10 may be different in e.g. shape and cell density and may be coated or uncoated in accordance with its intended use and function. Accordingly, the cell structure 10 may consist of e.g. a metallic or ceramic material and it may carry a coating for e.g. catalytic conversion.

Another way is to provide the deflector means 9, on the side thereof facing the flow of exhaust gas emissions, at least partly with a grid. The grid can consist of one or more grid elements arranged in a suitable way for optimum function. The grid facilitates collection of the emissions in liquid or particulate form.

Still another alternative is to provide the deflector means 9, on the side thereof facing the flow of exhaust gas emissions, at least partly with at least one heater element. The heater element promotes evaporation of the emissions in liquid form into emissions in gaseous form. While the layer 10 of porous material and the grid are located on the inside of the deflector means 9, the heater element or elements can be located on the inside of the deflector means as well as on the outside thereof, depending on the type of heater element and what is most appropriate. It can also be at least partly integrated therein; heating coils or similar may e.g. be located within the material of the deflector means 9 for heating thereof.

The deflector means 9 may be configured in any suitable way in order to optimize its function. Thus, and as is illustrated in the drawing, the deflector means comprises a dome-shaped cover 9, since this shape optimizes the deflection of the flow of exhaust gas emissions exiting the pipe member 8. The dome-shaped cover 9 has substantially the same diameter as the tubular member 3 of the catalytic converter 2. As is illustrated in the drawing, the dome-shaped cover 9 may thereby be connected to the tubular member 3 such that it covers the upstream end thereof and the downstream end of the pipe member 8.

In order to be able to collect excessive emissions in liquid form from the deflector means 9, e.g. if the layer 10 of porous material is saturated by emissions in liquid form or emissions in liquid form drip from the grid, a collector means 11 is provided for the deflector means. This collector means may to this end comprise e.g. a drain cup 11 which is located at the bottom of the deflector means 9. The collector means 11 may be located as in the illustrated embodiment according to FIG. 1 or, in case of a layer 10 of porous material in the form of an open structure of cells which is located at some distance from the side of the deflector means 9 facing the flow of exhaust gas emissions, between said cell structure and said side of the deflector means, e.g. close to said side of the deflector means, collecting emissions in liquid form therefrom. The collector means 11 is also subjected to heat from the exhaust gas emissions or may be heated by other means, e.g. in the same way as the deflector means is possibly heated, such that emissions in liquid form in the collector means evaporate into gaseous form.

The exhaust-gas aftertreatment device according to the present invention is particularly useful for achieving low hydrocarbon emissions on e.g. a flex fuel vehicle (E85) at very low temperatures. The ethanol does not contribute very much to the combustion at cold start, so there is, relatively seen, a large amount of fluid fuel in the exhaust system. The device according to the invention will increase the chances of bringing this fluid fuel to condense, then evaporate and finally to convert catalytically.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An exhaust-gas aftertreatment device for an internal combustion engine comprising:
   a catalytic converter comprising a tubular member defining a volume housing a catalytic converter substrate, the volume in communication with an inlet portion to receive exhaust gas emissions from the internal combustion engine and with an outlet portion to discharge the exhaust gas emissions after catalytic conversion thereof in the volume;
   an unobstructed pipe member within the tubular member and connecting the inlet portion with the volume and guiding the exhaust gas emissions from the inlet portion in a first direction of flow, the pipe member having an exit opening at a downstream end thereof in alignment with a longitudinal axis of the pipe member;
   a dome-shaped deflector having a diameter substantially equal to a diameter of the tubular member and located at the downstream end of the pipe member such that a central portion of the deflector is directly opposite the pipe member exit opening and the exhaust gas emissions exiting the pipe member are directed onto the deflector central portion and deflected into the volume and in a second direction of flow other than the first direction of flow, so that liquid unburned fuel in the exhaust gas emissions reaches and is deposited on the deflector;

a layer of porous material having an open cell structure spaced from a surface of the deflector facing the flow of exhaust gas emissions; and a collector positioned at a bottom of the deflector for collecting the liquid unburned fuel that drips from the deflector and/or the porous material after being deposited thereon.

2. The device of claim 1 wherein a cross-sectional area of the pipe member is less than a cross-sectional area of an inlet portion connected thereto.

3. The device of claim 1 wherein the pipe member is located centrally in the tubular member of the catalytic converter, extending in a longitudinal direction thereof.

4. The device of claim 1 wherein the pipe member has a length equal to a length of the tubular member of the catalytic converter.

5. The device of claim 1 wherein a cross-sectional area of the pipe member constitutes about 1-20% of a cross-sectional area of the tubular member of the catalytic converter.

6. An exhaust-gas aftertreatment device for an internal combustion engine comprising:

a catalytic converter comprising a tubular member defining a volume housing a catalytic converter substrate, wherein the volume communicates with an inlet portion to receive exhaust gas emissions from the internal combustion engine and with an outlet portion to discharge the exhaust gas emissions after catalytic conversion thereof in the volume;

an unobstructed pipe member within the tubular member and surrounded by the substrate, the pipe member connecting the inlet portion with the volume and guiding the exhaust gas emissions from the inlet portion in a first direction of flow, the pipe member having an exit opening at a downstream end thereof in alignment with a central axis of the pipe member;

a dome-shaped deflector having a central portion positioned directly opposite the pipe member exit opening such that exhaust gasses exiting the pipe member are directed onto the deflector central portion and deflected in a second direction of flow opposite to the first direction of flow and into the volume;

a layer of open cell porous material adjacent to and spaced from a surface of the deflector facing the flow of exhaust gas ; and a liquid collector adjacent to a lower portion of the deflector and between the deflector and the porous material.

7. An exhaust-gas aftertreatment device for an internal combustion engine comprising:

a catalytic converter comprising a tubular member which defines a volume housing a catalytic converter substrate, the volume communicating with an inlet portion to receive exhaust gas emissions from the internal combustion engine and with an outlet portion to discharge the exhaust gas emissions after catalytic conversion thereof in the volume;

an unobstructed pipe member within the tubular member and connecting the inlet portion with the volume and guiding the exhaust gas emissions from the inlet portion in a first axial direction of flow, the pipe member having an exit opening at a downstream end thereof in alignment with a longitudinal axis of the pipe member;

a dome-shaped deflector having a central portion positioned directly opposite the pipe member exit opening such that the exhaust gas emissions exit the pipe member exit opening impinge directly onto the deflector central portion and are redirected in a second direction of flow opposite to the first direction of flow so that liquid unburned fuel in the exhaust gas emissions is deposited on the deflector prior to the exhaust gas emissions passing though the volume;

a layer of open cell porous material between the pipe member exit opening and the deflector central portion such that at least a portion of the exhaust gas emissions exiting the pipe member pass through the porous material before contacting the deflector; and a drain cup located at a bottom of the deflector to collect the liquid unburned fuel that drips from the deflector and/or the layer of porous material.

* * * * *